Sept. 7, 1954 — A. NUTTING — 2,688,377
SELF-CLEANING OIL BATH GAS CLEANER
Filed April 12, 1950 — 2 Sheets-Sheet 1

INVENTOR.
ARTHUR NUTTING
BY Arthur J. Robert
ATTORNEY

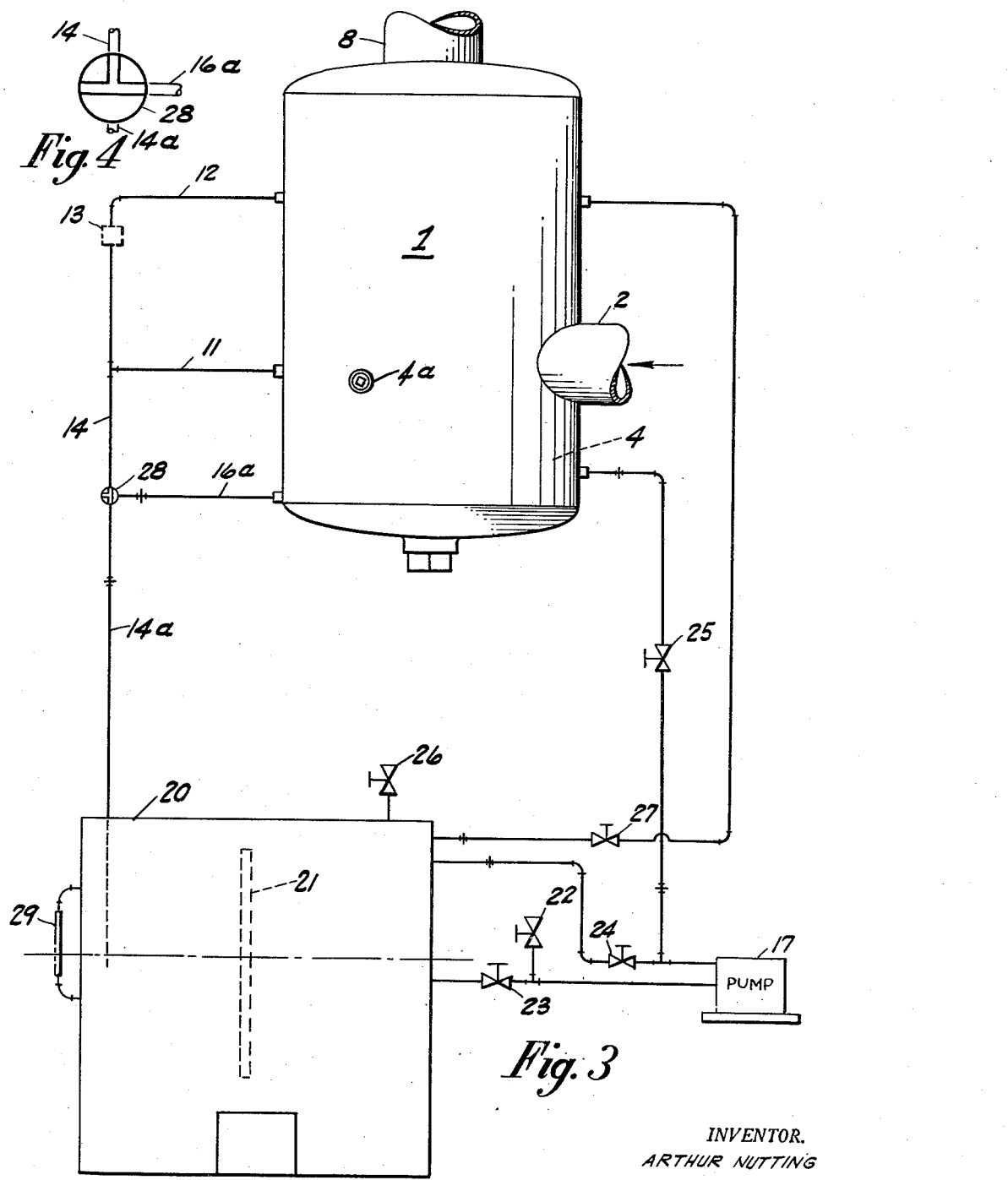

Patented Sept. 7, 1954

2,688,377

UNITED STATES PATENT OFFICE 2,688,377

SELF-CLEANING OIL BATH GAS CLEANER

Arthur Nutting, Louisville, Ky., assignor to American Air Filter Company, Inc., Louisville, Ky., a corporation of Delaware Application April 12, 1950, Serial No. 155,461

11 Claims. (Cl. 183—14)

This invention relates to self-cleaning liquid bath gas cleaners of the type disclosed in U. S. Patent No. 2,309,838. Cleaners of this type are largely used to clean the intake atmospheric air of compressors and various types of oil, gas and gasoline engines. They normally comprise: a bottom liquid-bath reservoir; a top gas filter medium; means constraining the incoming gas to impinge downwardly against the liquid bath and then turn to form a rising column of gas which flows upwardly through the filter medium to the clean gas outlet; a precleaner interposed between the reservoir and filter medium for centrifugally separating the bulk of entrained liquid and dust from the rising column of gas before it enters the filter medium; and means for collecting this centrifuged material and gravitationally draining it back to the liquid bath.

These cleaners drain oil back to the bath as fast as they separate such oil from the air stream; hence the operating liquid level at the lowest air velocity is only slightly below the static liquid level, which should stand at or close to the lower end of the precleaner in order to insure a heavy flow of liquid into the precleaner under low velocity operating conditions. This heavy flow is necessary, at the lowest gas velocity in its range of operation, to insure efficient operation. But with it, there is only a light flow of liquid into the filter medium. However, as the operating gas velocity progressively increases, the amounts of liquid carried into the precleaner and into the filter medium both progressively increase with the result that an upper limit is soon reached beyond which so much liquid is carried into the filter medium that some of it "pulls over," i. e., passes entirely through the filter medium and enters the outgoing clean air line.

Furthermore, this type of cleaner has not heretofore been capable of cleaning the high velocity air or gas normally encountered at pressures above atmospheric even where the liquid level is reduced sufficiently to avoid "pull-over." The reason for this is that, with such higher velocities, the gas pressure at the lower end of the precleaner, which opposes gravitational drainage, is, due to the pressure drop across the precleaner, higher than the pressure head of the drainage material, which favors gravitational drainage, this head comprising the relatively reduced gas pressure at the top of the precleaner plus the hydrostatic head or weight of the drainage material.

The principal object of this invention, therefore, is to provide a cleaner of this general character which, under atmospheric pressure conditions, may be operated over a wider and higher range of air flows without being subject to "pull-over" and, under gas pressure conditions, may be operated over the still higher velocities normally encountered with a proper return flow of separated liquid.

Another object is to provide a cleaner of this general character with means for controlling the return flow of separated liquid to the liquid reservoir.

A further object is to accomplish the foregoing objectives in a relatively simple manner.

The invention is illustrated in the accompanying drawing wherein:

Figure 3 is a more or less diagrammatic view illustrating the cleaner of Figure 1 in relation to another modification for connecting its drainage system to the oil bath; and Figure 4 is a diagrammatic view of the detail employed in Figure 3.

Figure 1.—Cleaner

Figures 1, 2:
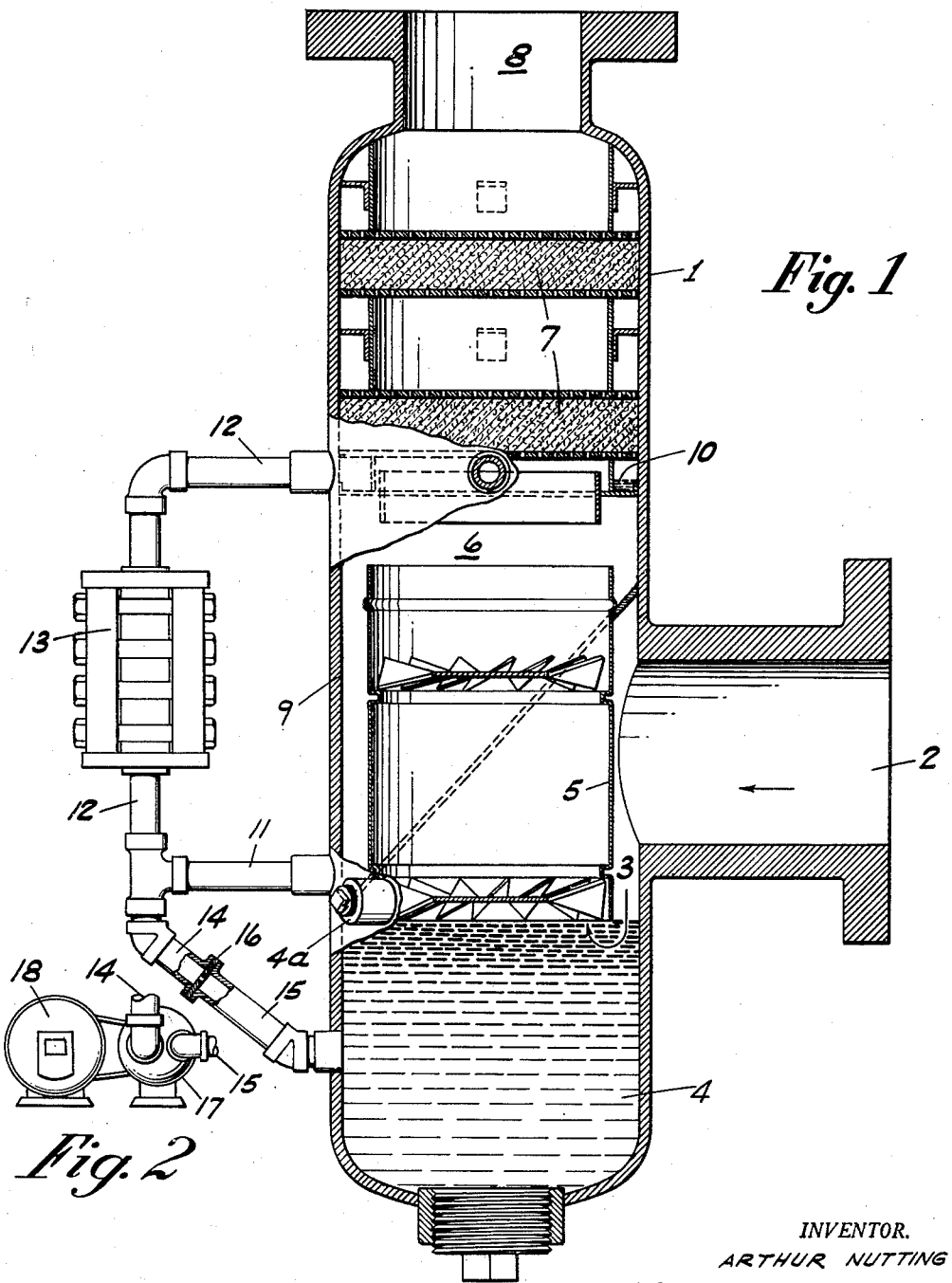
Figure 1 is a vertical sectional view, partly shown in elevation, illustrating one embodiment of the invention.
Figure 2 shows a modification to be used in connecting the drainage system of Figure 1 to the oil bath.

The cleaner illustrated in Figure 1 conventionally includes: a bottom liquid bath; a top air filter medium; a precleaner between the bath and the filter medium; and liquid collecting means. Since this cleaner is similar in construction and operation to that shown in U. S. Patent 2,309,838, it should suffice to describe its conventional structure by reference to its conventional operation as an atmospheric air cleaner.

Accordingly, atmospheric air enters the casing 1 through the inlet 2 and passes downwardly through the inlet chamber 3 where it impinges against the surface of the bath 4, of oil or other dust-catching liquid, as it turns to pass upwardly successively through the precleaner 5, space 6, and viscous impingement filter medium 7 to the clean gas outlet 8. In the precleaner 5, the lower and upper vanes impart a swirling motion to the air and this motion is operative not only to centrifuge most of the oil and dirt content of the air radially against the inner walls of the sleeve but also to move the resulting liquid film upwardly along that sleeve to space 6 and there force it outwardly around the upper end of the precleaner sleeve into the collecting chamber 9. The residue oil and dust content in the air is removed by filter medium 7 and drained back into collecting chamber 10.

The static liquid level of the oil bath 4 should be arranged at or very close to the lower end of the precleaner 5 to insure a heavy flow of liquid into and through the precleaner at the lowest operating air velocity. Such level is therefore employed in the present case. It may be initially determined by removing the overflow plug 4a and filling the reservoir with oil until it begins to drain through the overflow, at which time the supply is cut off and the plug 4a replaced.

Heretofore the liquid, collecting in chambers 9 and 10, has been gravitationally drained back to the bath 4 at the same rate as it is separated from the air so that the operating liquid level at the lowest air velocity is but slightly below the static level shown. As the operating air velocity progressively increased, there was a progressive increase in the rate of liquid flow through the precleaner. Since more and more bath liquid was carried through the precleaner, more and more residue liquid was carried into the filter medium. As a consequence of the progressive increase in the amount of residue liquid carried into the filter medium and in the velocity of the air passing through it, an upper operating air velocity limit was soon reached at and beyond which liquid was carried or blown entirely through the filter medium 7 into the clean air outlet 8. This objectionable condition is herein called "pull-over."

I have found that it is possible to operate efficiently over a still wider and higher range of air velocities and yet avoid "pull-over" by holding the return flow of oil from the collecting system to the oil bath, under all operating air velocities ranging from low to high, at the low rate required to maintain the proper operating liquid level for the lowest operating air flow. In other words, at the lowest operating air velocity, where normally the smallest amount of oil is carried upwardly through the precleaner, I return the oil to the bath as fast as it is separated from the air and thereby maintain the bath at a level close to the static level, while, for progressively higher air velocities, where progressively larger amounts of oil are carried upwardly through the precleaner with an unrestricted return flow, I continue to use the same low rate of return flow or at least an approximation thereof.

With this arrangement, the operation of my device at the lowest air velocity continues as before. The entering low velocity air strikes the oil bath and carries oil therefrom upwardly through the precleaner at a rate largely dependent upon the location of the bath level with respect to the lower end of the precleaner. With the static level adjacent the lower end of the precleaner, the oil flow through the precleaner occurs at a heavy but relatively low rate and the return flow of separated oil occurs at the same rate so that the operating level remains at a fixed elevation adjacent the static level. However, as the air velocity progressively increases, the air initially picks up and carries more oil through the precleaner. But since the return flow of oil remains at the initial low rate, there is a progressive loss of oil from the bath. As a result, its operating level progressively decreases, causing the air to pick up progressively less oil. This condition continues until the oil level decreases to a point where the oil flow through the precleaner is the same as the return flow to the bath. Since the oil flow through the precleaner is thus held at a heavy but relatively low rate at all operating air velocities, it will be obvious that operating air velocities above the limit, which results in "pull-over" with an unrestricted return flow, may now be employed. Furthermore, I have found that such flow of oil is heavy enough to insure efficient cleaning over the entire air flow range.

In carrying out my invention, the collecting chambers 9 and 10 are drained gravitationally through a drainage system which, in combination with chambers 9 and 10, provides an oil holding capacity capable of receiving and holding all of the oil which may be picked up from the bath between its high static level and the lower liquid level at which the incoming gas, at its highest operating velocity, initially ceases to pick up liquid from the bath, and means are provided for feeding oil from the drainage system back to the oil bath at a low controlled rate equal to the low separation rate at which entrained liquid is separated from the air at the lowest operating air velocity. Thus, in the arrangement shown in Figure 1, the collecting chamber 9 is provided with a drainage conduit 11 while collecting chamber 10 is provided with a drainage conduit 12 having a sight gauge 13, and these two drainage conduits 11 and 12 discharge into drainage conduit 14. The drainage conduit 14 is connected to the oil bath through a conduit 15 containing a flow restricting orifice plate 16 which restricts the return flow into the bath to said low separation rate.

The collection chambers and the drainage system hold progressively larger quantities of oil at progressively higher operating air velocities. Nevertheless, the pressure head of this liquid at the orifice plate 16, and therefore the rate of the restricted return flow, should remain approximately constant or at least not vary significantly because the increased weight of oil is largely offset by the corresponding loss in air pressure at chambers 9 and 10 due to the progressively increasing pressure drop across the precleaner with progressively higher operating air velocities.

*Figure 2.—Modification*

In Figure 2, an oil pump 17, suitably driven as by an electric motor 18 which may be a variable speed motor, is substituted for the orifice plate to provide a forced return flow at a fixed rate. With a variable speed motor, this fixed rate may be changed from time to time as operating conditions warrant. For example, if the installation, in which the cleaner is used, is modified to operate at a lower or higher air velocity, the fixed return rate may be changed to accommodate this variation in operation.

The use of the pump in an atmospheric air cleaner of this character is desirable because it permits precise control of the return flow. The increase in the operative air flow range of a cleaner of this character, when equipped with a return flow pump, is very substantial. For example, one standard embodiment of this cleaner when operated with unrestricted gravitational drainage has an air flow range extending from a rated low of 200 C. F. M. to a high of 400 C. F. M. However, with the return flow controlled at the low rate, the same cleaner has an air flow range extending from 200 C. F. M. to over 700 C. F. M.

Another very important advantage arising out of the use of a return flow pump is that it renders this type of cleaner capable of use in relatively high pressure systems. In atmospheric air cleaners, the hydrostatic head, due to the weight of the collected liquid in the drainage system, is sufficiently higher than the pressure drop across the precleaner to produce a free-flowing or unrestricted gravitational drainage. However, as the operating gas pressure progressively increases above atmospheric, the pressure drop across the precleaner will progressively increase in a manner such as to approach, equal and then exceed the hydrostatic head of the drainage liquid. Consequently, in high-pressure systems, gravitational drainage is progressively restricted as the magnitude of the precleaner pressure drop progressively approaches the magnitude of the hydrostatic head of the drainage liquid; hence gravitational drainage becomes impossible under all operating conditions where the pressure drop equals or exceeds the hydrostatic head. With a pump in the return system, however, a return flow can be forced in this type of cleaner and the rate of return controlled, the operation being the same as in the atmospheric air cleaner. It will, of course, be understood that with a pump, the rate of return is set at the low rate, i. e., the return flow is the same as the separation rate at the low operating air velocity with the bath level at the proper elevation for such operating air velocity. This same low rate of return flow will be maintained by the pump at all higher air velocities.

*Figure 3.—Arrangement*

In some forced return flow installations it may be desirable to pass the return flow through a settling tank which not only functions as a settling tank permitting much of the collected dirt to settle out of the oil, but also as a storage tank permitting the cleaner to operate for lengthy periods of time before requiring a change of oil. An arrangement of this character, using a settling tank 20 with a baffle 21 compelling incoming oil to flow to the bottom of the tank on its way to the tank outlet, is shown in Figure 3.

In Figure 3: the compartments 9 and 10 drain gravitationally through conduits 11 and 12 to conduit 14 which connects with the settling tank 20; the intake conduit of pump 17 may be connected to either a source of oil supply through valve 22 or the settling tank through valve 23; the outlet conduit of the pump may be connected to either the settling tank through valve 24 or the oil bath 4 through valve 25; the air space of the settling tank may be vented to atmosphere through valve 26 or connected to the space 6 of the gas cleaner through valve 27 in order to place the oil in the settling tank under the same gas pressure as exists in the cleaner 1 at or adjacent the space 6; and a three-way valve 28 connects gravitational drainage conduit 14 either through conduit 16a to the oil bath or through conduit 14a to the settling tank 20.

To charge the settling tank 20 with oil, a flow line is established from a tank car, oil drum or other source of oil supply (not shown) through valve 22, pump 17 and valve 24 to the settling tank 20. In this connection, valve 23 on the intake side of the pump, and valve 25 on the discharge side thereof are closed while vent valve 26 is open. When the oil reaches the predetermined level shown in tank 20, which can be observed in sight gauge 29, the oil supply is cut off by closing valve 22.

The oil bath is next charged with oil up to a predetermined level corresponding to that level at which it flows through overflow plug 4a. Accordingly, this plug is removed and the flow line established from settling tank 20 through valve 23, pump 17 and valve 25 to the oil bath, it being understood that supply valve 22 on the intake side of the pump and valve 24 on the discharge side thereof are closed while line 16a is connected to conduit 14 through three-way valve 28 which is manipulated to the position shown in Figure 4, wherein conduit 14a is disconnected from both conduits 14 and 16a. This allows the oil to stand above valve 28 to the same extent as it stands in the oil bath but prevents the oil bath from draining into the settling tank.

In operation, the oil bath charging line remains open; a drainage line is established by manipulating valve 28 to the position shown in Figure 3 wherein it connects drainage conduit 14 through conduit 14a to the settling tank 20; and vent valve 26 is closed, while equalizing pressure valve 27 is open to place the settling tank under the gas pressure equivalent to that prevailing at the top of the precleaner. The device is now in condition to receive the incoming gas.

With the introduction of gas through inlet 2, it will pass as before through casing 1 to outlet 8 and it will pick up oil from the oil bath 4, and recollect it in chambers 9 and 10 from which the collected oil drains immediately to the settling tank 20. With the pump in operation, a metered flow of oil passes from the tank 20 directly to the oil bath 4. Again this metered flow will be at the low rate necessary to maintain the proper oil bath level at the lowest air velocity.

Having described my invention, I claim:

1. An improvement in self-cleaning liquid bath gas cleaners of the type, having a lower liquid bath, a clean gas outlet and gas cleaning means extending upwardly from adjacent the static level of the bath, wherein, over operating velocities ranging from low to high, the incoming gas impinges downwardly against the bath to pick up liquid therefrom as it turns to pass upwardly through the gas cleaner which operates to separate the bulk of the entrained liquid from the upwardly moving gas before it passes on to the gas outlet comprising: conduit means arranged to receive the separated liquid and having a capacity at least equal to the volume of all of the liquid in the bath between its relatively high static level and the lower liquid level at which the incoming gas, at its highest operating velocity, initially ceases to pick up liquid from the bath, said means preventing the free flow of drainage liquid back into the bath; and flow control means, operative substantially throughout the air flow range, for flowing liquid into the bath at a controlled rate approximating the low rate at which entrained liquid is separated from the gas at its lowest operating velocity.

2. The cleaner of claim 1 wherein: the conduit means and the flow control means cooperate to drain separated liquid gravitationally into the bath; and the flow control means includes means for restricting said gravitational flow to said controlled rate.

3. The cleaner of claim 2 wherein: said restricting means is in the form of an orifice plate.

4. The cleaner of claim 1 wherein: the flow control means includes a pump for forcing separated liquid into said bath at said controlled rate.

5. The cleaner of claim 1 wherein: the conduit means and the flow control means cooperate to drain separated liquid gravitationally into the bath; and the flow control means includes a pump for forcing separated liquid into said bath at said controlled rate.

6. The cleaner of claim 1 wherein: said conduit means includes a settling tank into which the separated liquid from the cleaner gravitationally drains; and said flow control means includes a pump for forcing liquid from the settling tank into the bath at said controlled rate.

7. The cleaner of claim 6 wherein: said settling tank has a sealed gas space over the liquid normally contained in it; and means for equalizing the pressure between said space and the gas space adjacent the upper end of said gas cleaner.

8. A gas cleaner comprising: a self-cleaning gas cleaner of the type having means providing a lower liquid pick up area, an upper horizontally disposed impingement filter medium which operates to remove dust and liquid from the gas and to permit the dust-laden liquid to drain gravitationally to one side of the air flow, means constraining the incoming air to flow into the pick up area to pick up liquid therefrom and then flow upwardly through the filter medium and drainage means positioned to receive the dust-laden liquid draining gravitationally from the filter medium; and a pump for flowing replacement liquid into the pick up area at a controlled rate.

9. The gas cleaner of claim 8 wherein the self-cleaning gas cleaner is of the type having a liquid bath and means constraining the incoming gas to impinge downwardly against the bath to pick up liquid as it turns to pass upwardly therefrom.

10. A gas cleaner comprising: a self-cleaning gas cleaner of the type having means providing a lower pick-up area, an upper gas cleaning means which operates to remove dust and liquid from the gas, and means constraining the incoming air to flow into the pick-up area to pick up liquid therefrom and then to flow upwardly from the pick-up area through the upper gas cleaning means; means for draining liquid from the gas cleaning means, said drainage means preventing the free flow of drainage liquid into the pick-up area; and means, operative substantially throughout the air flow range, for feeding replacement liquid into the pick-up area at a relatively constant rate.

11. The gas cleaner of claim 10 wherein: the feeding means includes a pump.

References Cited in the file of this patent

UNITED STATES PATENTS

| Number | Name | Date |
|---|---|---|
| 1,838,511 | Wilson | Dec. 29, 1931 |
| 2,239,620 | Neumann | Apr. 22, 1941 |
| 2,254,600 | Ditto | Sept. 2, 1941 |
| 2,309,838 | Fitch et al. | Feb. 2, 1943 |
| 2,509,510 | Lee et al. | May 30, 1950 |